INVENTOR.
CHARLES GARDNER SWAIN

United States Patent Office 3,300,622
Patented Jan. 24, 1967

3,300,622
ELECTRICAL SENSING DEVICE
Charles Gardner Swain, Arlington, Mass., assignor to Arthur D. Little, Inc., Cambridge, Mass., a corporation of Massachusetts
Filed June 19, 1964, Ser. No. 376,419
14 Claims. (Cl. 219—497)

This invention relates to a sensing device and more particularly to one which is capable of sensing changes in resistance or capacitance and of providing a suitable signal of such changes.

In monitoring and controlling the temperature of a system over a period of time it is necessary to be able to detect temperature fluctuations and to employ these to provide a suitable signal which can in turn be used to control a heating or cooling source. For example, it may be desirable to maintain a chemical reaction or a physical system at a constant temperature over an extended period of time, e.g., for weeks or even months. This requires a device which is capable of both continuously and accurately measuring the temperature of the system as well as controlling an external heating or cooling source to make whatever adjustments are required to maintain the desired temperature level within the system.

Another example of the need for a device such as is disclosed herein may be cited. In the testing of such passive circuit elements as resistors and capacitors for comparison with a standard it is necessary to determine whether or not they meet certain specifications. This requires an indication of resistance or capacitance above or below the standard. The apparatus of this invention is suitable for such uses as well as any other use which requires continuous or periodic comparison of a sample with a standard, the development of a suitable signal which is capable of evaluating such a comparison, and if desired, of actuating a control circuit.

Prior art devices designed to accomplish such monitoring and control normally incorporate an electrical bridge and an amplifier. The amplifier in turn must be driven with either D.C. or A.C. modulated current. Further, some form of synchronous detection must be provided which in turn leads to a relatively complicated circuit if a high degree of accuracy is to be obtained. This characteristic of complication is naturally inherent in any device which is based upon detecting and amplifying voltage values and their differences. It would therefore be desirable to have available an apparatus which would be simple to construct and operate but which at the same time would be capable of accurately monitoring and controlling a system.

It is therefore a primary object of this invention to provide a sensing device which is simple to construct and operate and which still possesses the accuracy associated with the more complicated comparable devices which are based upon a determination and evaluation of voltage differences. It is another object of this invention to provide a device of the character described which can monitor and control the temperature of a system over an extended period of time and maintain the temperature within a few hundredths of a degree centigrade. It is yet another object of this invention to provide such a device which is flexible in application and is adaptable to uses wherein small changes in resistance or capacitance can be used to measure and control physical processes. Another object of this invention is to provide such a device which is capable of being integrated into systems wherein such a device becomes a part of a monitoring and control system. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps all as exemplified in the following detailed disclosure, and the scope of the invention will be indicated in the claims.

For a fuller understanding of the nature and objects of the invention reference should be had to the following detailed description taken in connection with the accompanying drawings in which FIG. 1 is a composite plot of time versus voltage for reference and sensing circuits and selected points in the circuit of the device;

The sensing device of this invention is designed to measure the time constant of a resistor-capacitor system and to compare this time constant with a standard. In effect, it is based upon the determination of which of two threshold-sensing switches first receives a predetermined threshold voltage. The order in which these switches close then determines further action in the circuit. Thus this is in direct contrast to the measurement of voltage differences which is an essential part of the prior art devices. The measurement of the time constant permits the use of relatively simple circuitry while at the same time it provides for accurate monitoring and the producing of a periodic signal which in turn can be used to control one or more other devices such as a heater.

For purposes of illustration the following description of the apparatus and method of this invention will be presented in terms of its use as a temperature controlling device. However, modifications of the apparatus will be discussed and it is not intended to limit the apparatus and method of this invention to its use in monitoring and controlling temperature.

Figure 1:
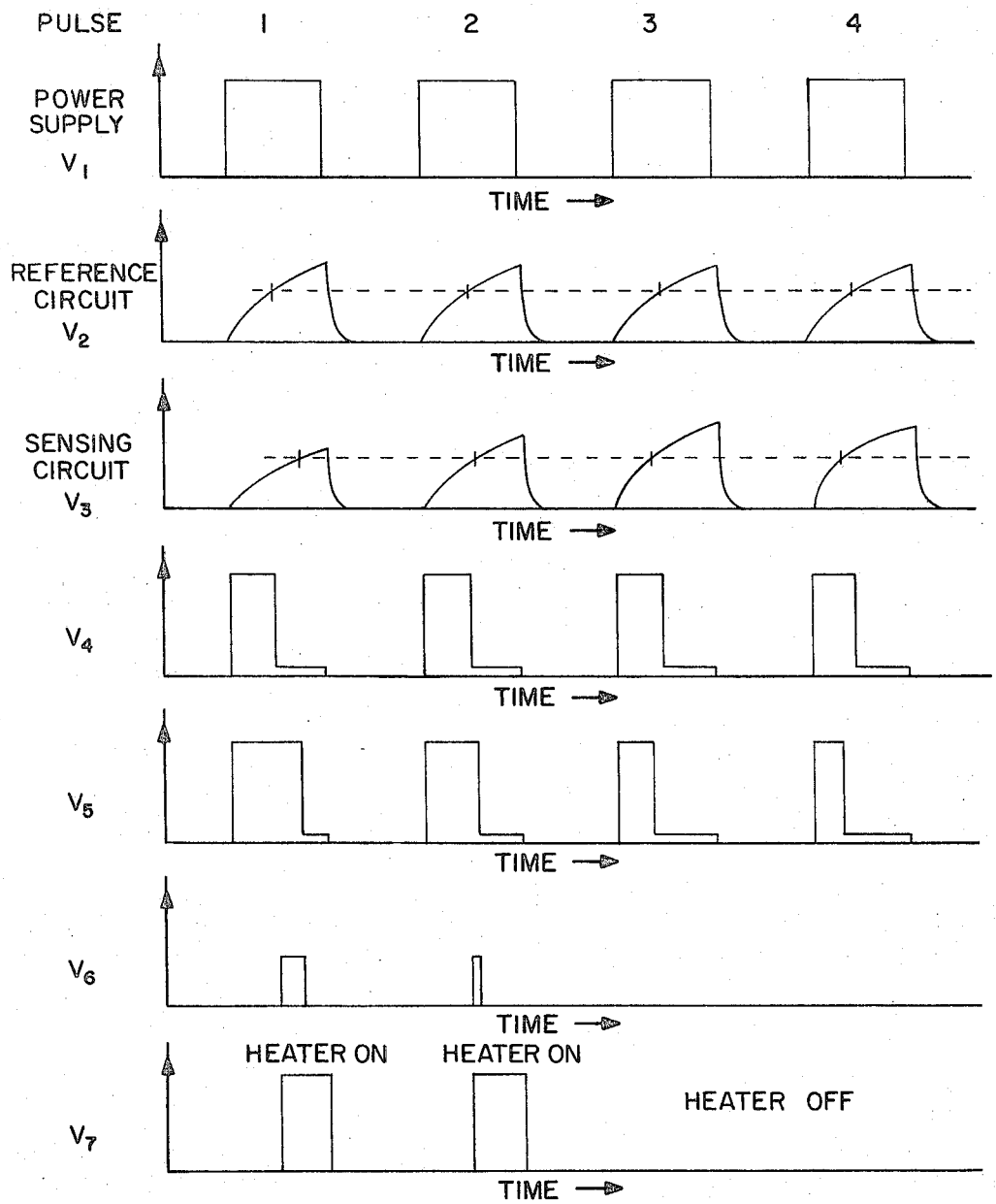
Figure 2:
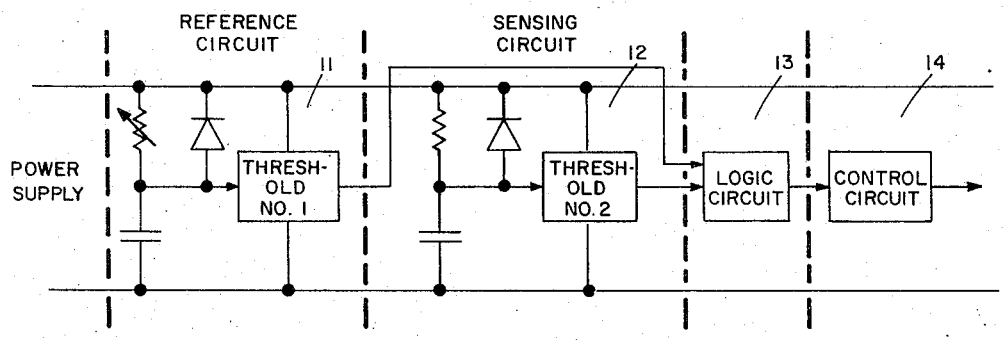
FIG. 2 is a generalized circuit diagram of the apparatus of this invention.
Figure 3:
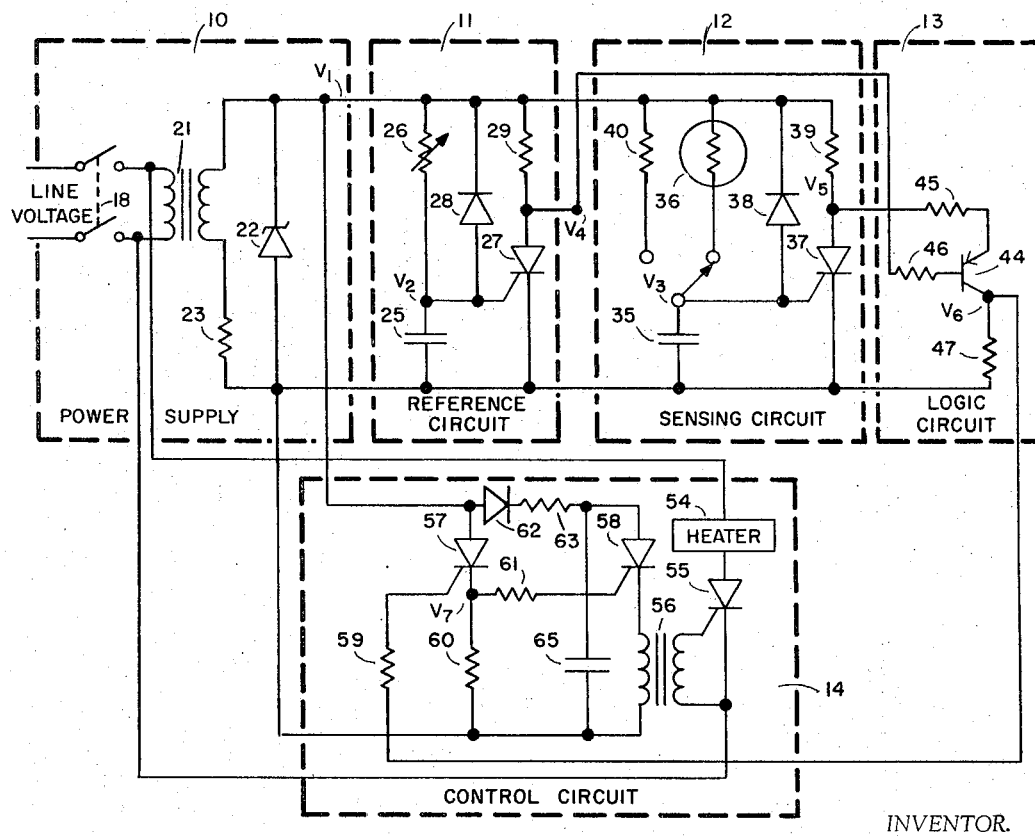
FIG. 3 is a circuit diagram of one embodiment of the apparatus of this invention.

As will be seen in FIGS. 1–3, the apparatus may be divided into circuit components; and it includes among the other components, a reference circuit and a sensing circuit. Each of these two circuit components incorporates a resistor and a capacitor in series. The resistor of the reference circuit is adjustable to a certain reference value, i.e., one corresponding to a desired temperature level, and the capacitors in the two circuits are of known fixed capacitance. In the example illustrated in FIGS. 1–3, which is designed as a temperature controlling device, the resistor in the sensing circuit is a thermistor which is of course a resistor sensitive to fluctuations in temperature. Thus the resistor-capacitor of the sensing circuit can be made to produce a voltage time pattern which is determined by the temperature of the thermistor and hence of the system; while the voltage-time pattern of the reference circuit remains constant. The periodic comparison of these patterns is used to determine whether or not a heater is to be actuated.

FIG. 1 illustrates the manner in which such periodic comparisons are made and plots the voltage at selected points indicated in FIG. 3.

The two circuits are driven with square wave voltages such as represented in the top line of FIG. 1. Thus voltage is provided periodically to the two circuits, and each has a characteristic voltage-time pattern characteristic of the resistor-capacitor combination, such as shown in FIG. 1. A threshold voltage is set for two switches, one being in the reference circuit, the other in the sensing circuit and that voltage which reaches this threshold value first determines, for the period of time involved, whether the heater is to be turned on or left off, the latter condition being its normal state. The evaluation of this time constant, i.e., which circuit reaches threshold temperature first is performed with every pulse of the square wave voltage supplied and hence there is provided an essentially continuous measurement and control of the temperature. Before describing the operation of the apparatus in more detail it will be convenient to examine the basic circuit of FIG. 2 and then to present one specific embodiment of it with reference to FIG. 3. From FIG. 2 it will be seen that the reference circuit 11 and sensing circuit 12 are constructed to be responsive whenever a predetermined voltage threshold in a threshold sensing switch is exceeded. That switch which responds first is the one which then transmits a signal to a logic circuit and the action of the logic circuit is thus determined. In the case of the temperature control device used as an illustration in describing the apparatus, the logic circuit will, through the control circuit, turn on a heater or cause it to remain off.

FIG. 3 illustrates one specific embodiment of the sensing device of this invention. It will be appreciated that the components of the circuitry shown are illustrative and that one skilled in the art may substitute their equivalent in performance without departing from the scope of the invention. The circuit illustrated in FIG. 3 comprises a combination of five components, each of which may be considered to be a circuit which interacts with the remaining circuit components to produce the desired result. These components are blocked off by dotted lines in FIG. 3 and comprise the power supply 10, a reference circuit 11, a sensing circuit 12, a logic circuit 13 and a control circuit 14. The control circuit may or may not be actuated depending upon the information received by the logic circuit. This information in turn is based upon the responses of the reference and sensing circuits to power supplied to them.

The power supply 10 is seen to be adapted for receiving line voltage through a switch 18. That power which is used to drive the reference and sensing circuits must be in the form of pulsating D.C. and the necessary conversion to this form is accomplished by the provision of a suitable rectifier such as a zener diode 22. A resistor 23, designed to limit current to the device, completes the power supply component 10 along with transformer 21.

The reference circuit component is seen to b comprised of a reference capacitor 25, an adjustable reference resistor 26 which is set at a predetermined value, and a threshold switch such as a silicon controlled switch 27. This switch may be any device which is capable of producing a signal when a voltage threshold is exceeded. In addition to a silicon controlled switch, it may be a unijunction transistor, a tunnel diode, a transistor with proper circuit, or the like.

A diode 28 is provided to effect the necessary rapid discharge of the capacitor 25 and a resistor 29 is incorporated into the circuit to insure the proper functioning of switch 27 in its actuation of the logic circuit.

The sensing circuit similarly comprises a reference capacitor 35 (which is in this illustration the equivalent to reference capacitor 25 of the reference circuit) a resistance element subjected to the temperature fluctuations of the system to be monitored and in this illustration a thermistor 36, a silicon controlled switch 37, or other device as defined above, a diode 38 and resistor 39. Finally there is also a calibration resistor 40 which is used to calibrate the reference resistor 26 in the reference circuit.

The logic cicuit component comprises a suitable means for controlling the flow of current to the control circuit, in this case a transistor 44 along with resistors 45, 46, and 47, the purpose of which is to actuate the control circuit if switch 27 of the reference circuit closes before switch 37 of the sensing circuit.

The control circuit in FIG. 3 is illustrated as one which is suitable for actuating a heater which is associated with the system, the temperature of which is to be monitored and controlled. This control circuit comprises a heater 54, a switch such as a silicon controlled rectifier 55, a pulse transformer 56, switches 57 and 58, resistors 59, 60 and 61 a diode 62, resistor 63 and a capacitor 65 associated with transformer 56 and designed to supply the necessary pulses to the transformer.

In the operation of this apparatus illustrated in FIGS. 1 and 2 the heater 54 of the control circuit is off and is only turned on during the time that the power is supplied to the reference and sensing circuits and provided that the reference circuit so indicates the need for heat to be supplied to the system. This is accomplished in the following manner. Assume that the voltage in the reference circuit $V_2$ is that illustrated in FIG. 1 and that the voltage $V_3$ in the sensing circuit varies as illustrated in that drawing. During pulses 1 and 2, the voltage in the reference circuit reaches the threshold voltage first by virtue of the fact that the resistance in the thermistor 36 has increased, the increase being brought about by a decrease in thermistor temperature. Hence the voltage in the sensing circuit builds up more slowly than in the reference circuit which in turn means that the reference switch 27 closes before the sensing switch 37. The net result is that transistor 44 can conduct and a pulse is transmitted to transformer 56 of the control circuit and current is transmitted through the silicon controlled rectifier 55 to heater 54. The heater is therefore turned on and remains on for the remainder of the square pulse and shown by the voltage $V_7$ pulse. The heater will remain off so long as no current is transmitted to it through the circuitry described.

In the example of FIG. 1, the heat delivered by the heaters' being on during pulses like 1 and 2 was sufficient to raise the temperature of the system and hence of the thermistor 36. This increase in thermistor temperature therefore decreases its resistance and results in the voltage in the sensing circuit building up more rapidly than in the reference circuit in pulse 3. Thus sensing circuit switch 37 closes first, transistor 44 remains non-conducting, no pulse is transmitted to the transformer 56 and the heater 54 remains off as indicated by the absence of a voltage pulse $V_7$. This is, of course, the desired situation since the temperature of the system is sufficiently high. The heater will not be turned on again until there arises the situation such as that which obtains in pulse 1 where the temperature of the systems drops below the desired level.

If the power from the line is 60-cycle, then the temperature of the system will be monitored, and if necessary adjusted, 60 times a second. Apparatus constructed in accordance with this invention has been demonstrated to have the capability of controlling temperature to within ±0.01° C. over a period of more than one month. The apparatus is thus extremely reliable and accurate while remaining simple to construct, install and maintain.

The above description has been given in terms of using a resistance element which is subject to temperature fluctuations. However, it is also possible to use a fixed resistance and a variable capacitor in the sensing circuit, if the property of the system to be measured and controlled is one which is capable of changing the capacitance of the capacitor by some known relationship. As an example, the distance between the plates of any given capacitor determines its capacitance and if one of the plates is caused to move, e.g., through the application of pressure, then the change in capacitance can be reflected in the voltage-time pattern of the sensing circuit as shown in FIG. 1. This change can then be used in the same manner as described.

The apparatus of this invention may also be used to test resistors or capacitors. For example, the sensing circuit may be so constructed that resistors to be evaluated may be dropped into place with suitable timing to permit them to be evaluated for one or more pulses. The information thus obtained may be used to flash a visible signal to an operator, or may be stored for a proper length of time in a suitable memory system which will in turn determine the disposition of the resistor. In like manner capacitors can be evaluated.

In a modification of the apparatus of FIGS. 2 and 3, the resistors 36 and 40 in the sensing circuit may be replaced by inductors, and the capacitor 35 by a resistor. This arrangement will provide a means for measuring, and if desired controlling, inductance. The wave forms which result from such substitutions are identical to those shown for the circuitry of FIG. 3. The net result of such substitutions is to have a sensing circuit with a resistor and a reactor in series, the reactor being either a capacitor or an inductor.

It will be apparent from the above description that this invention provides method and apparatus for sensing a physical property and if desired of exercising continuous control over that property. In particular, there is provided a reliable, accurate and simple means for temperature control.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. An electrical sensing device capable of evaluating a physical property of a system compared with a reference standard, comprising in combination
    (a) a reference circuit comprising
        (1) a reference capacitor,
        (2) a reference resistor in series with said reference capacitor whereby pulsed voltage supplied to said reference circuit develops therein a standard reference pulsed pattern, and
        (3) a reference switch responsive to a predetermined voltage level in said reference circuit;
    (b) a sensing circuit associated with said system comprising
        (1) a sensing capacitor,
        (2) a sensing resistor in series with said sensing capacitor the combination of which is responsive to said property whereby pulsed voltage supplied to said sensing circuit develops therein a pulsed pattern determined by said physical property,
        (3) a sensing switch responsive to a predetermined voltage level in said sensing circuit equal to said predetermined level in said reference circuit;
    (c) power supply means adapted to deliver pulsating direct current to said reference circuit and said sensing circuit; and
    (d) a logic circuit connected to said reference and sensing switches and adapted to be electrically responsive only when a predetermined one of said switches closes first.

2. An electrical sensing device in accordance with claim 1 wherein said sensing resistor is responsive to said physical property and said sensing capacitor is fixed.

3. An electrical sensing device in accordance with claim 2 wherein said sensing resistor is responsive to temperature.

4. An electrical sensing device in accordance with claim 1 wherein said sensing capacitor is responsive to said physical properties and said sensing resistor is fixed.

5. An electrical sensing device in accordance with claim 1 further characterized by having a diode in said reference circuit and a diode in said sensing circuit adapted to effect rapid discharge of said reference and sensing capacitors.

6. An electrical sensing device in accordance with claim 1 wherein said power supply means comprises a transformer and a zener diode.

7. An electrical sensing device in accordance with claim 1 further characterized by having a control circuit responsive to signals generated in said logic circuit.

8. A temperature monitoring and controlling device adapted to maintain the temperature of a system constant within a few hundredths of a degree, comprising in combination
    (a) a reference circuit comprising
        (1) a reference capacitor,
        (2) a reference resistor in series with said reference capacitor whereby pulsed voltage supplied to said reference circuit develops therein a standard reference pulsed pattern, and
        (3) a reference switch responsive to a predetermined voltage level in said reference circuit;
    (b) a sensing circuit associated with said system comprising
        (1) a sensing capacitor,
        (2) a sensing resistor responsive to temperature changes in said system and in series with said sensing capacitor whereby pulsed voltage supplied to said sensing circuit develops therein a pulsed pattern determined by the temperature of said system,
        (3) a sensing switch responsive to a predetermined voltage level in said sensing circuit equal to said predetermined level in said reference circuit;
    (c) power supply means adapted to deliver pulsating direct current to said refernce circuit and said senssing circuit;
    (d) a logic circuit connected to said reference and sensing switches and adapted to be electrically responsive only when said reference switch closes first; and
    (e) a control circuit incorporating heating means in heat applying relationship with said system and being responsive to signals transmitted by said logic circuit.

9. A temperature monitoring and controlling device in accordance with claim 8 wherein said sensing resistor is a thermistor.

10. A temperature monitoring and controlling device in accordance with claim 8 wherein said reference and sensing switches are silicon conrtolled switches.

11. A temperature monitoring and controlling device in accordance with claim 8 wherein said reference circuit and said sensing circuit each incorporates a diode adapted to effect rapid discharge of said capacitors.

12. A temperature monitoring and controlling device in accordance with claim 8 wherein said control circuit includes a pulse transformer adapted to supply electrical pulses to said heating means.

13. An electrical sensing device capable of evaluating a physical property of a system compared with a reference standard, comprising in combination
    (a) a reference circuit comprising
        (1) a reference capacitor,
        (2) a reference resistor in series with said reference capacitor whereby pulsed voltage supplied to said reference circuit develops therein a standard reference pulsed pattern, and
        (3) a reference switch responsive to a predetermined voltage level in said reference circuit;
    (b) a sensing circuit associated with said system comprising
        (1) a sensing reactor,
        (2) a sensing resistor in series with said sensing reactor the combination of which is responsive to said property whereby pulsed voltage supplied to said sensing circuit develops therein a pulse pattern determined by said physical property,
        (3) a sensing switch responsive to a predetermined voltage level in said sensing circuit equal to said predetermined level in said reference circuit;

(c) power supply means adapted to deliver pulsating direct current to said refernce circuit and said sensing circuit; and (d) a logic circuit connected to said reference and sensing switches and adapted to be electrically responsive only when a predetermined one of said switches closes first.

14. An electrical sensing device in accordance with claim 13 wherein said sensing reactor is an inductor.

References Cited by the Examiner

UNITED STATES PATENTS

| | | | |
|---|---|---|---|
| 2,752,473 | 6/1956 | Hage | 219—497 |
| 2,944,137 | 7/1960 | Kaltenbach | 219—497 |
| 3,040,157 | 6/1962 | Hukee | 219—501 |

RICHARD M. WOOD, *Primary Examiner.*

L. H. BENDER, *Assistant Examiner.*